(12) United States Patent
Pistre et al.

(10) Patent No.: US 8,223,586 B2
(45) Date of Patent: Jul. 17, 2012

(54) METHOD AND SYSTEM TO DETERMINE THE GEO-STRESSES REGIME FACTOR Q FROM BOREHOLE SONIC MEASUREMENT MODELING

(75) Inventors: Vivian Pistre, Beijing (CN); Gongrui Yan, Beijing (CN); Bikash K. Sinha, Cambridge, MA (US); Romain Prioul, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 452 days.

(21) Appl. No.: 12/564,101

(22) Filed: Sep. 22, 2009

(65) Prior Publication Data

US 2010/0238764 A1 Sep. 23, 2010

Related U.S. Application Data

(60) Provisional application No. 61/109,579, filed on Oct. 30, 2008.

(51) Int. Cl.
*G01V 1/00* (2006.01)
(52) U.S. Cl. .......................................... 367/25; 367/38
(58) Field of Classification Search ............... 73/152.01, 73/152.16, 597, 784; 175/40, 50; 181/104, 181/105; 367/27, 31, 32, 73, 86; 702/6, 702/9, 11, 12, 13, 14, 15, 18; 703/10
See application file for complete search history.

(56) References Cited

U.S. PATENT DOCUMENTS

| | | | |
|---|---|---|---|
| 5,398,215 A | 3/1995 | Sinha et al. | |
| 5,838,633 A | 11/1998 | Sinha | |
| 6,351,991 B1 | 3/2002 | Sinha | |
| 6,714,480 B2 | 3/2004 | Sinha et al. | |
| 6,714,873 B2 | 3/2004 | Bakulin et al. | |
| 6,904,365 B2 | 6/2005 | Bratton et al. | |

OTHER PUBLICATIONS

Schlumberger, "BorStress Specifications & Development Plan Document," 2001, pp. 1-35.*
Schlumberger, "GeoFrame 4.2, BorStress User's Guide," Nov. 2004, pp. 1-41.*
Cesaro et al., "Shaping up to stress in the Apennines," Reservoir Optimization Conference, Italy, 2000, pp. 64-73.*
U.S. Appl. No. 61/109,579, Provisional Patent Application, filed Oct. 30, 2008.
Sayers, Colin M, "Sensitivity of Elastic-Wave Velocities to Stress Changes in Sandstones", The Leading Edge, Dec. 2005, pp. 1262-1266.
Prioul, et al., "Nonlinear Rock Physics Model for Estimation of 3D Subsurface Stress in Anisotropic Formations: Theory and Laboratory Verification", Geophysics, vol. 69, No. 2, Mar.-Apr. 2004, pp. 415-425.
Sarkar, et al., "Anisotropic Inversion of Seismic Data for Stressed Media: Theory and a Physical Modeling Study on Berea Sandstone", Geophysics, vol. 68, No. 2, (Mar.-Apr. 2003) pp. 690-704.

* cited by examiner

*Primary Examiner* — Jack W Keith
*Assistant Examiner* — Daniel L Murphy
(74) *Attorney, Agent, or Firm* — Jianguang Du; Hoffman Warnick LLC

(57) ABSTRACT

Methods and systems for analyzing subterranean formations in-situ stress are disclosed. A method for extracting geological horizon on-demand from a 3D seismic data set, comprises receiving sonic log data; computing the anisotropic shear moduli $C_{44}$, $C_{55}$ and $C_{66}$; determining in-situ stress type and selecting an in-situ stress expression corresponding to the in-situ stress type; computing stress regime factor Q of the formation interval; and computing and outputting the maximum stress $\sigma_H$ by using the stress regime factor Q, Vertical stress $\sigma_v$ and Minimum horizontal stress $\sigma_h$.

12 Claims, 9 Drawing Sheets

METHOD AND SYSTEM TO DETERMINE THE GEO-STRESSES REGIME FACTOR Q FROM BOREHOLE SONIC MEASUREMENT MODELING

BACKGROUND OF INVENTION

1. Field of the Invention

The invention relates to method and system for borehole sonic measurement, more particularly, the invention relates to method and system for analyzing the formation rock in-situ stress.

2. Background Art

Extracting quantitative information of the formation rock stresses from borehole log measurements is fundamental to the analysis and prediction of geo-mechanical problems encountered in the petroleum industry. Today there is no direct measurement to fully characterize the formation rock geo-stresses tensor (three principal stresses and three angles to describe the directions). For most of cases it can be reasonably assumed that the vertical stress is one principal stress, so, there are four parameters to describe the geo-stresses: vertical stress, minimum horizontal, maximum horizontal stresses and the azimuth of minimum horizontal stress. Thus, the in-situ stresses of a formation can be represented by the vertical stress, maximum horizontal stress, minimum horizontal stress, azimuth of minimum horizontal stress and the pore pressure. The vertical stress may be estimated from an integral of the density log, while the minimum horizontal stress can be estimated using fracturing or leak-off test data, and its direction from borehole caliper or images analysis. However, the maximum horizontal stress is more difficult to estimate, the conventional approach is to use some correlations such as the pore-elastic strain correlation, or the approximations such as equating the maximum horizontal stress to some multiple of the minimum horizontal stress.

However, these kinds of correlations for estimating maximum horizontal stress are always associated with big uncertainty. In addition, there is no correlation or model available to interpret directly from the vertical and minimum horizontal stresses logging to that of the maximum horizontal stress. Recent developments in sonic logging involve measuring the formation rock anisotropic wave velocities induced by in-situ stress anisotropy, which have been discussed in the following patents and publications. (1) U.S. Pat. No. 5,838,633 issued to Sinha et al., discloses a method for formation stress magnitude and formation non-linear parameters by using a high frequency sonic signal and a low frequency sonic signal; (2) U.S. patent application Ser. No. 12/413,178, Method to estimate subsurface principal stress directions and ellipsoid shape factor R from borehole sonic log anisotropy directions and image log failure directions, by Romain Prioul, et al.; (3) Colin M. Sayers, *Sensitivity of elastic-wave velocities to stress changes in sandstones*, The Leading Edge, December 2005, 1262-1266, discloses the relation between elastic-wave velocity change and the in-situ stress change; (4) U.S. Pat. No. 6,904,365 issued to Bratton, T. R. et al, discloses a method for determining formation stress parameter by using radial stress profile derived from the logging data and formation models; (5) Sarkar, D., Bakulin, A., and Kranz, R., 2003, *Anisotropic inversion of seismic data for stressed media: Theory and a physical modeling study on Berea Sandstone*: Geophysics, 68, 690-704, discusses modeling the relationship between the magnitude of the principal stresses and anisotropic parameters; (6) Prioul, R., A. Bakulin, V. Bakulin (2004), *Non-linear rock physics model for estimation of 3-D subsurface stress in anisotropic formations: Theory and laboratory verification*, Geophysics, Vol. 69, pp. 415-425 and (7) U.S. Pat. No. 6,714,873, System and method for estimating subsurface principal stresses from seismic reflection data, issued to Bakulin, et al., discusses determining formation stress characteristics by using the relationship between the measured seismic data and the known rock properties and elastic stiffness and/or sonic velocity.

Accurate estimation of geological formation stresses is desirable in the hydrocarbon production business, because formation stress determination is considered critical for hydrocarbon production planning, as well as providing prediction of sanding and borehole stability. As a result, there is a growing demand in the art for accurate estimation or determination of formation stresses.

SUMMARY OF INVENTION

In one aspect, the invention relates to method for using the borehole sonic anisotropy measurement for analyzing in-situ stress. It can be used in the cases when the formation rock anisotropic shear modulus $C_{44}$, $C_{55}$ and $C_{66}$ could be obtained, either from borehole sonic tools, or from seismic and other acoustic measurement.

The present invention relates to methods for analyzing in-situ stress, particularly computing maximum stress $\sigma_H$ from sonic log data represented in three dimensions (3D). A method in accordance with one embodiment of the invention includes receiving a first log data and a second log data; computing the anisotropic shear moduli $C_{44}$, $C_{55}$ and $C_{66}$ by using the first log data; determining in-situ stress type based on the anisotropic shear moduli $C_{44}$, $C_{55}$ and $C_{66}$ and selecting an in-situ stress expression corresponding to the in-situ stress type; computing Vertical stress $\sigma_v$ and Minimum horizontal stress $\sigma_h$ by using the second log data; computing stress regime factor Q of the formation interval based on the in-situ stress type; and computing and outputting the maximum stress $\sigma_H$ by using the stress regime factor Q, Vertical stress $\sigma_v$ and Minimum horizontal stress $\sigma_h$.

In another aspect, the present invention relates to systems for analyzing formation in-situ stress. A system in accordance with one embodiment of the invention includes a processor and a memory, wherein the memory stores a program having instructions for: receiving a first log data and a second log data; computing the anisotropic shear moduli $C_{44}$, $C_{55}$ and $C_{66}$ by using the first log data; determining in-situ stress type based on the anisotropic shear moduli $C_{44}$, $C_{55}$ and $C_{66}$ and selecting an in-situ stress expression corresponding to the in-situ stress type; computing Vertical stress $\sigma_v$ and Minimum horizontal stress $\sigma_h$ by using the second log data; computing stress regime factor Q of the formation interval based on the in-situ stress type; and computing and outputting the maximum stress $\sigma_H$ by using the stress regime factor Q, Vertical stress $\sigma_v$ and Minimum horizontal stress $\sigma_h$.

Another aspect of the invention relates to a computer-readable medium storing a program having instructions for: receiving a first log data and a second log data; computing the anisotropic shear moduli $C_{44}$, $C_{55}$ and $C_{66}$ by using the first log data; determining in-situ stress type based on the anisotropic shear moduli $C_{44}$, $C_{55}$ and $C_{66}$ and selecting an in-situ stress expression corresponding to the in-situ stress type; computing Vertical stress $\sigma_v$ and Minimum horizontal stress $\sigma_h$ by using the second log data; computing stress regime factor Q of the formation interval based on the in-situ stress type; and computing and outputting the maximum stress $\sigma_H$ by using the stress regime factor Q, Vertical stress $\sigma_v$ and Minimum horizontal stress $\sigma_h$.

Other aspects and advantages of the invention will become apparent from the following description and the attached claims.

DETAILED DESCRIPTION

Figure 1A:
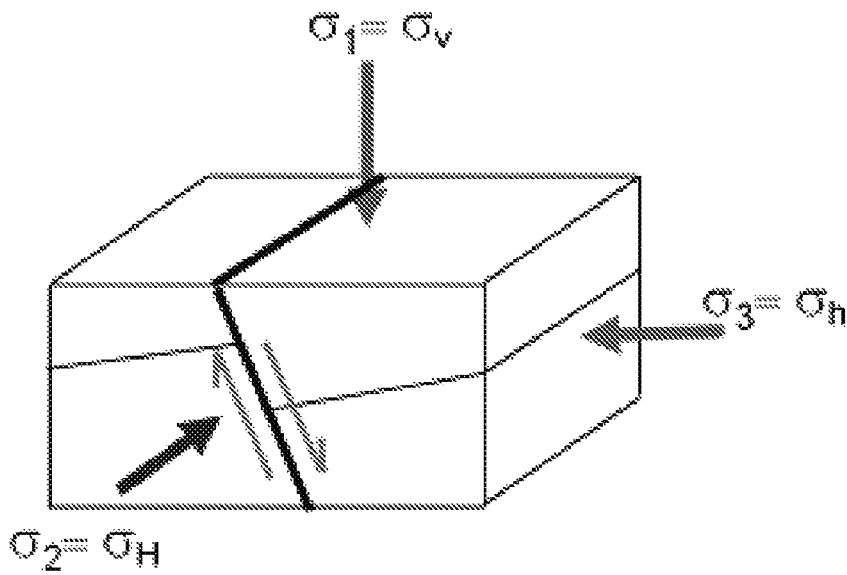
FIG. 1a-1c shows examples of three typical faults.

Embodiments of the invention relate to methods and systems for data processing, particularly data represented in three dimensions (3D). Embodiments of the invention are particularly useful in processing data obtained from oil and gas exploration, such as sonic logging. For clarity, the following description may use sonic measurement data prospecting to describe embodiments of the invention. However, one of ordinary skill in the art would appreciate that embodiments of the invention may also be applied to other types of data.

Formation rock geo-stress can be fully characterized by a stress tensor (three principal stresses and three angles to describe the directions). For most of cases in deep formation, it can be reasonably assumed that the vertical stress is a principal stress. Thus, geo-stresses in a random point within a formation can be represented by four parameters: vertical stress $\sigma_V$, minimum horizontal $\sigma_h$, maximum horizontal stresses $\sigma_H$ and the azimuth of minimum horizontal stress. The vertical stress may be estimated from an integral of the density log, while the minimum horizontal stress can be estimated using fracturing or leak-off test data, and the azimuth of minimum horizontal stress from borehole caliper, images analysis or alternatively from sonic fast-shear azimuth. According to one embodiment of the present invention, a stress regime factor Q is introduced to characterize in-situ stress state and estimate maximum horizontal stress; and it helps to solve the difficulty in measuring maximum horizontal stress.

The Stress Regime factor Q indicates the degree of rock formation geo-stress anisotropy. This concept of Stress Regime Factor Q can be deduced from stress parameters that are derived from borehole information, such as, orientation of breakouts, stress induced fractures and slips.

Assuming the three principal stresses as $\sigma_1$, $\sigma_2$ and $\sigma_3$ (total stress here and $\sigma_3 <= \sigma_2 <= \sigma_1$), the stress ratio factor R is defined as:

$$R = \frac{\sigma_2 - \sigma_3}{\sigma_1 - \sigma_3} \quad (0 \leq R \leq 1) \tag{1}$$

Figure 1B:
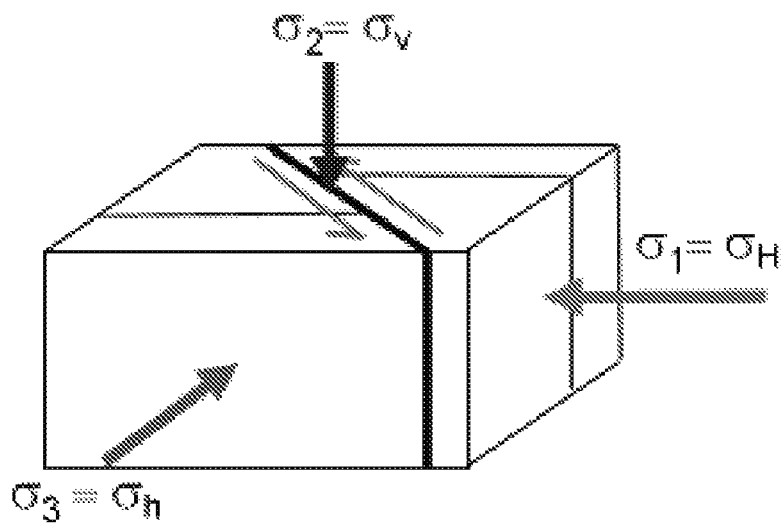
Figure 1C:
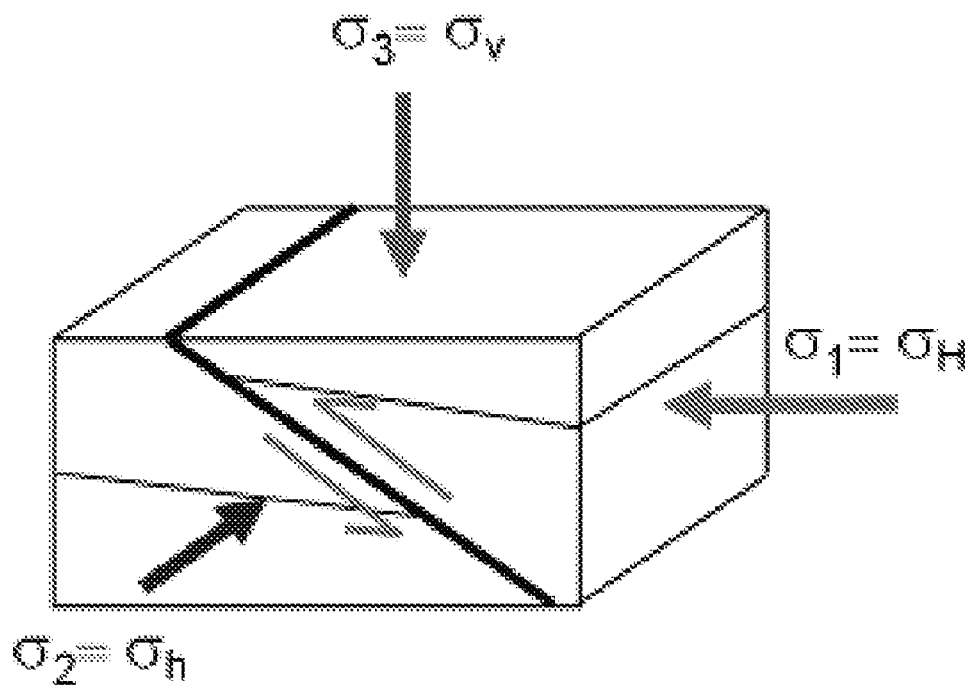

As can be seen from the above equation, R represents only the degree of anisotropy of the three principal stresses, but irrelevant to the order of vertical stress $\sigma_V$ comparing with the two horizontal stresses. The vertical stress $\sigma_V$ is a very important identification for stress characterization. As shown in FIG. 1, different stress orders represent totally different stress environments. Therefore, for the three main categories of stress environments, the stress ratio factor R can be represented as:

$$R_1 = \frac{\sigma_H - \sigma_h}{\sigma_V - \sigma_h}$$

Where $\sigma_1$ is the vertical (Normal fault),
i.e. $\sigma_V >= \sigma_H >= \sigma_h$ $$R_2 = \frac{\sigma_V - \sigma_h}{\sigma_H - \sigma_h} = \frac{1}{R_1}$$

Where $\sigma_2$ is the vertical (Strike-slip faults),
i.e. $\sigma_H >= \sigma_V >= \sigma_h$ $$R_3 = \frac{\sigma_h - \sigma_V}{\sigma_H - \sigma_V}$$

Where $\sigma_3$ is the vertical (Thrust faults),
i.e. $\sigma_H >= \sigma_h >= \sigma_V$ Thus, Stress Regime factor Q is defined as follow:

$$Q = R_1 = \frac{\sigma_H - \sigma_h}{\sigma_V - \sigma_h} \tag{2}$$

Where $\sigma_1$ is the vertical (Normal fault),
i.e. $\sigma_V >= \sigma_H >= \sigma_h$ $$Q = 2 - R_2 = 2 - \frac{\sigma_V - \sigma_h}{\sigma_H - \sigma_h} \tag{3}$$

Where $\sigma_2$ is the vertical (Strike-slip faults),
i.e. $\sigma_H >= \sigma_V >= \sigma_h$ $$Q = 2 + R_3 = 2 + \frac{\sigma_h - \sigma_V}{\sigma_H - \sigma_V} \tag{4}$$

Where $\sigma_3$ is the vertical (Thrust faults),
i.e. $\sigma_H >= \sigma_h >= \sigma_V$ The advantage of the factor Q representation is that it presents not only the degree of formation rock stress anisotropy, but also the characteristic of stress model. As shown in FIG. 1a, for normal faults stress regime, $0<=Q<=1$; as shown in FIG. 1b, for strike-slip faults stress regime, $1<Q<=2$; and as shown in FIG. 1c, for thrust faults stress regime, $2<Q<=3$.

Sonic wave velocities in sedimentary formation are stress-dependent, and the rock formation under the effect of anisotropic in-situ stresses (which is true for almost most of the cases) will exhibit anisotropic elasticity. With the development of advanced borehole sonic tools, such as, but not limited to, Sonic Scanner tool available from Schlumberger, the anisotropic elastic behavior of formation rock can be measured and analyzed.

Figure 2A:
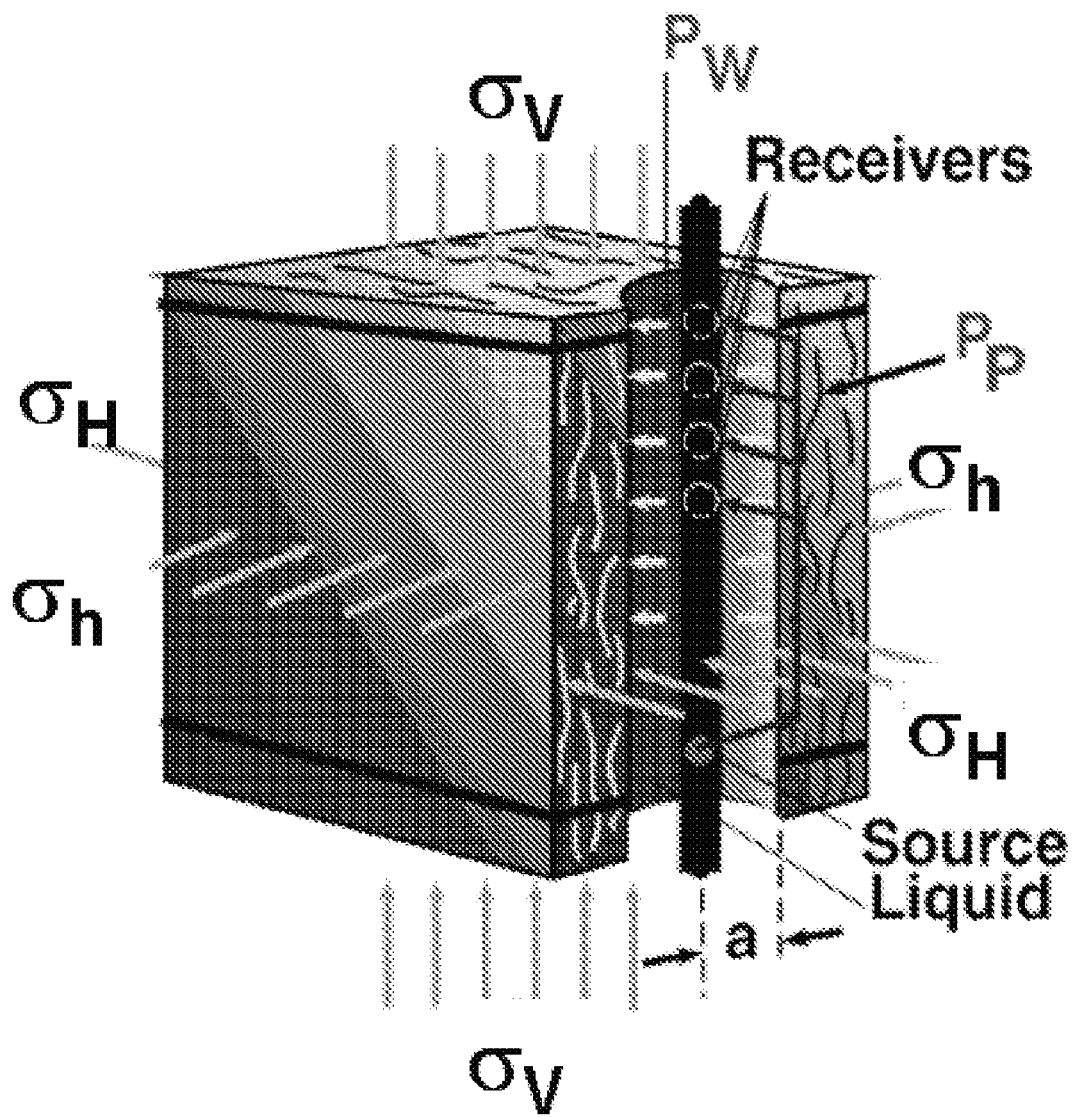
FIG. 2a is a schematic representation of formation rock around borehole, also showing of stress in the rock, a sonic transmitter, a set of sonic receivers and a depth interval AB.
Figure 2B:
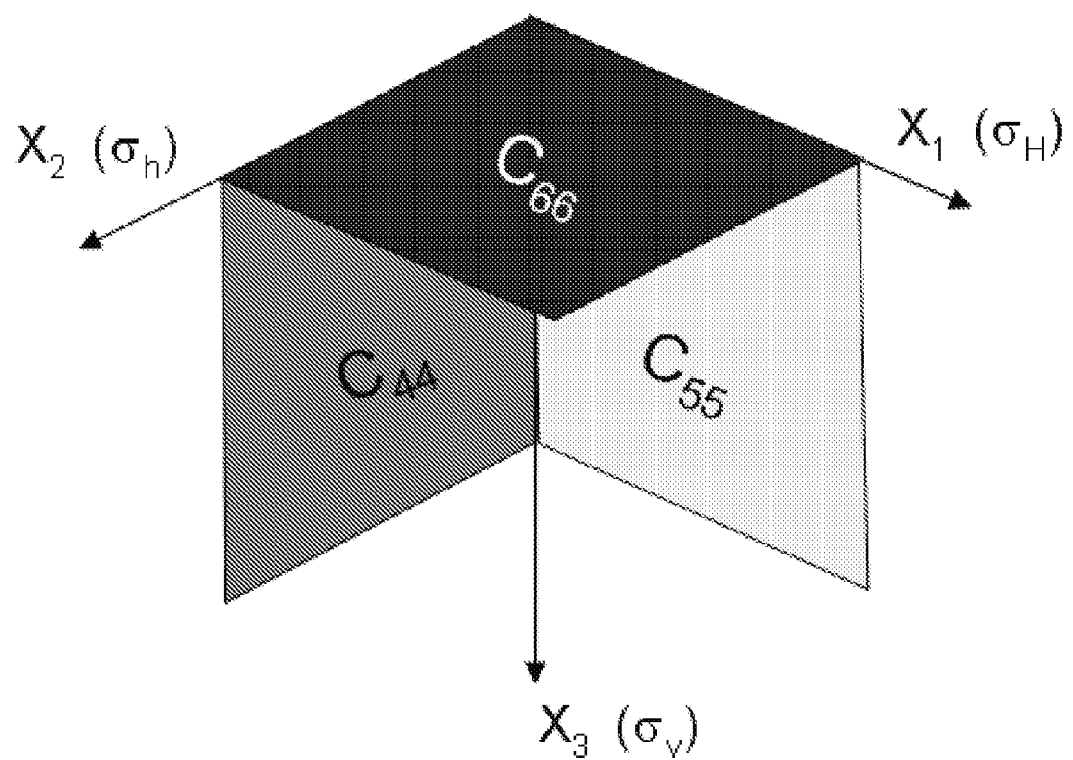
FIG. 2b schematically illustrates a set of anisotropic shear moduli $C_{44}$, $C_{55}$ and $C_{66}$.

As shown in FIG. 2a, considering the situation that the formation rock buried under the vertical stress $\sigma_V$, minimum horizontal stress $\sigma_h$, maximum horizontal stress $\sigma_H$, and pore pressure $P_p$. Define a $X_1$, $X_2$, $X_3$-coordinate system where the borehole axis ($X_3$) is aligned with vertical stress $\sigma_V$, and the $X_1$-axis is aligned with the direction of $\sigma_H$. As shown in FIG.

2b, by using a sonic tool, three shear modulus of the formation, $C_{44}$, $C_{55}$ and $C_{66}$, can be calculated. The method of determining anisotropic moduli of earth formations is disclosed in U.S. Pat. No. 6,714,480 issued to Sinha et al., the entire teaching is incorporated herein as reference. Here the Voigt conventional matrix notation is used, wherein $C_{44}$ is the shear moduli in the plane of $X_2$-$X_3$ ($\sigma_h$ and $\sigma_V$), $C_{55}$ in the plane of $X_3$-$X_1$ ($\sigma_V$ and $\sigma_H$) and $C_{66}$ in the plane of $X_1$-$X_2$ ($\sigma_h$ and $\sigma_H$).

Based on an assumption that the material is intrinsic isotropy (i.e. in the absence of stress), and the perturbation theory of stress-dependent elastic model as described in U.S. Pat. No. 6,351,991, Determining stress parameters of formations from multi-mode velocity data, by Sinha, et al., the anisotropic changes in elastic shear moduli $C_{44}$ and $C_{66}$, induced by the anisotropic stress ($\sigma_V$, $\sigma_H$, $\sigma_h$ and pore pressure $P_p$) can be described as:

$$\Delta C_{44} - \Delta C_{66} = \left[\frac{E}{1+\upsilon} + 2C_{44} + (C_{155} - C_{144})\right] \cdot \frac{1+\upsilon}{E}(\Delta\sigma_V - \Delta\sigma_H) \quad (5)$$

where E, $\upsilon$, and $C_{44}$ are the Young's modulus, Poisson's ratio, and shear modulus of the formation in the chosen reference state (initial state); and $C_{155}$ and $C_{144}$ are the formation non-linear constants in the reference state. As all of these parameters are the elastic properties of material in the reference state, which is by definition the isotropic condition, so equation 5 can be simplified as:

$$\Delta C_{44} - \Delta C_{66} = AE \cdot (\Delta\sigma_V - \Delta\sigma_H) \quad (6)$$

Where:

$$AE = \left[\frac{E}{1+\upsilon} + 2C_{44} + (C_{155} - C_{144})\right] \cdot \frac{1+\upsilon}{E} \quad (7)$$

AE is the parameter representing the formation isotropic property at reference state (Initial state), which refers to the changes in elastic moduli caused by the changes in stress applied to this propagating medium, it is not dependent on any direction.

Following the same philosophy, equations for ($C_{44}$-$C_{55}$) and ($C_{55}$-$C_{66}$) are given as follow:

$$\Delta C_{44} - \Delta C_{55} = AE \cdot (\Delta\sigma_h - \Delta\sigma_H) \quad (8)$$

$$\Delta C_{55} - \Delta C_{66} = AE \cdot (\Delta\sigma_V - \Delta\sigma_h) \quad (9)$$

For the intrinsic isotropic material such as sand formation, it can be reasonably assumed that a reference state of isotropic elastic moduli is under the action of isotropic stress (isotropic stress $\sigma^0$ and the isotropic shear moduli $C_{44}^0$), and so it can also be give as follow:

$$\Delta C_{44} = C_{44} - C_{44}^0, \Delta C_{55} = C_{55} - C_{44}^0, \Delta C_{66} = C_{66} - C_{44}^0 \Delta\sigma_V = \sigma_V - \sigma^0, \Delta\sigma_H = \sigma_H - \sigma^0, \Delta\sigma_h = \sigma_h - \sigma^0 \quad (10)$$

Substituting the above into equation 6, 8 and 9:

$$C_{66} - C_{44} = AE \cdot (\sigma_H - \sigma_V) \quad (11)$$

$$C_{44} - C_{55} = AE \cdot (\sigma_h - \sigma_H) \quad (12)$$

$$C_{55} - C_{66} = AE \cdot (\sigma_V - \sigma_h) \quad (13)$$

There are only two independent equations among equations (11), (12) and (13), rewrite as:

$$\frac{\sigma_H - \sigma_h}{\sigma_V - \sigma_h} = \frac{C_{55} - C_{44}}{C_{55} - C_{66}} = R_1 = \frac{1}{R_2} \quad (14)$$

$$\frac{\sigma_h - \sigma_V}{\sigma_H - \sigma_V} = \frac{C_{66} - C_{55}}{C_{66} - C_{44}} = R_3 \quad (15)$$

The above expressions indicate the relationship between anisotropic shear moduli and anisotropic stress for the intrinsic isotropic medium, such as, a sand formation. According to one embodiment of the present invention, this correlation does not rely on the reference state (no $\sigma^0$ and $C_{44}^0$ items in equations (14) and (15)) or the stress sensitivity property AE, even though it had been introduced in the above deduction process.

As for the model for the intrinsic anisotropic sedimentary formation, considering a relatively homogeneous shale interval buried in deep formation, and the increments of the stresses from top depth to deep depth are $\Delta\sigma_V$, $\Delta\sigma_H$ and $\Delta\sigma_h$, and the increment of pore pressure is $\Delta P_p$. The increment of anisotropic Shear moduli, $\Delta C_{44}$, $\Delta C_{55}$ and $\Delta C_{66}$ can be measured by sonic tools. Thus, it can reasonably be assumed that the shale formation in this interval has the same degree of intrinsic anisotropy, and the increase of shear moduli along from the top to the depth, $\Delta C_{44}$, $\Delta C_{55}$ and $\Delta C_{66}$ is caused by the increase of stress. Based on this assumption, equation (5) can be approximated as follow:

$$\Delta C_{44} - \Delta C_{66} \approx \left[\frac{E}{1+\upsilon} + 2C_{44}^0 + (C_{155}^0 - C_{144}^0)\right] \cdot \frac{1+\upsilon}{E}(\Delta\sigma_V - \Delta\sigma_H) \quad (16)$$

Equation (16) appears similar to equation (5), but has a different physical meaning. In equation (5), differences are related to the reference state as explained in equation (10), while for the shale model, the difference is between the top and bottom of the chosen interval with a reasonably uniform lithology. Following the same steps:

$$\frac{\Delta\sigma_H - \Delta\sigma_h}{\Delta\sigma_V - \Delta\sigma_h} = \frac{\Delta C_{55} - \Delta C_{44}}{\Delta C_{55} - \Delta C_{66}} \quad (17)$$

$$\frac{\Delta\sigma_h - \Delta\sigma_V}{\Delta\sigma_H - \Delta\sigma_V} = \frac{\Delta C_{66} - \Delta C_{55}}{\Delta C_{66} - \Delta C_{44}} \quad (18)$$

These two equations clearly express the relation of stress increments to that of anisotropic shear moduli in a relatively uniform lithology shale interval.

As for the relation between the Stress regime Q with the measured sonic anisotropy, substituting sand anisotropy model (equations 14 and 15) into Q equations, the model for sand formation will be given as follow:

For Normal fault stress regime ($\sigma_V \geq \sigma_H \geq \sigma_h$):

$$Q = \frac{\sigma_H - \sigma_h}{\sigma_V - \sigma_h} = R_1 = \frac{C_{55} - C_{44}}{C_{55} - C_{66}} \quad (19)$$

$$(0 \leq Q \leq 1)$$

For Strike-slip fault stress regime ($\sigma_H >= \sigma_V >= \sigma_h$):

$$Q = 2 - \frac{\sigma_V - \sigma_h}{\sigma_H - \sigma_h} = 2 - R_2 = 2 - \frac{C_{55} - C_{66}}{C_{55} - C_{44}} \quad (20)$$

$(1 < Q \le 2)$

For Thrust fault stress regime ($\sigma_H >= \sigma_h >= \sigma_V$):

$$Q = 2 + \frac{\sigma_h - \sigma_V}{\sigma_H - \sigma_V} = 2 + R_3 = 2 + \frac{C_{66} - C_{55}}{C_{66} - C_{44}} \quad (21)$$

$(2 < Q \le 3)$

With the measured anisotropic shear moduli $C_{44}$, $C_{55}$, $C_{66}$ and the order of their magnitudes, it can also be used directly to identify the stress regime. As shown in above equations, $C_{55} > C_{44} > C_{66}$ means the Normal faults stress regime, $C_{55} > C_{66} > C_{44}$ means the Strike-slip stress regime and $C_{66} > C_{55} > C_{44}$ means the Thrust faults stress regime. Based on the above discussion, the stress regime factor Q can be extracted from the sonic data, as summarized below:

| Shear Moduli Ranking | Stress Regime | Q factor |
|---|---|---|
| $C_{55} > C_{44} > C_{66}$ | Normal faults | $0 \le \frac{C_{55} - C_{44}}{C_{55} - C_{66}} \le 1$ |
| $C_{55} > C_{66} > C_{44}$ | Strike-slip faults | $1 < \frac{C_{55} + C_{66} - 2C_{44}}{C_{55} - C_{44}} \le 2$ |
| $C_{66} > C_{55} > C_{44}$ | Thrust faults | $2 < \frac{3C_{66} - 2C_{44} - C_{55}}{C_{66} - C_{44}} \le 3$ |

According to one embodiment of the present invention, the factor Q may also result from caliper & images analysis of borehole shape failure, such as breakout and induced fracture. The system for analyzing borehole shape failure includes, but not limited to, BorStress system available from Schlumberger. It can also be obtained using borehole sonic anisotropy directions (e.g. fast-shear azimuth also called FSA) in one or multiple deviated boreholes, either independently or in combination with other data. More details of the process of obtaining factor Q by using borehole sonic anisotropy directions in one or multiple deviated boreholes is disclosed by a commonly owned U.S. patent application Ser. No. 12/413,178, Method to estimate subsurface principal stress directions and ellipsoid shape factor R from borehole sonic log anisotropy directions and image log failure directions, by Romain Prioul, et al., the entire teaching is incorporated herein as reference.

Figure 3:
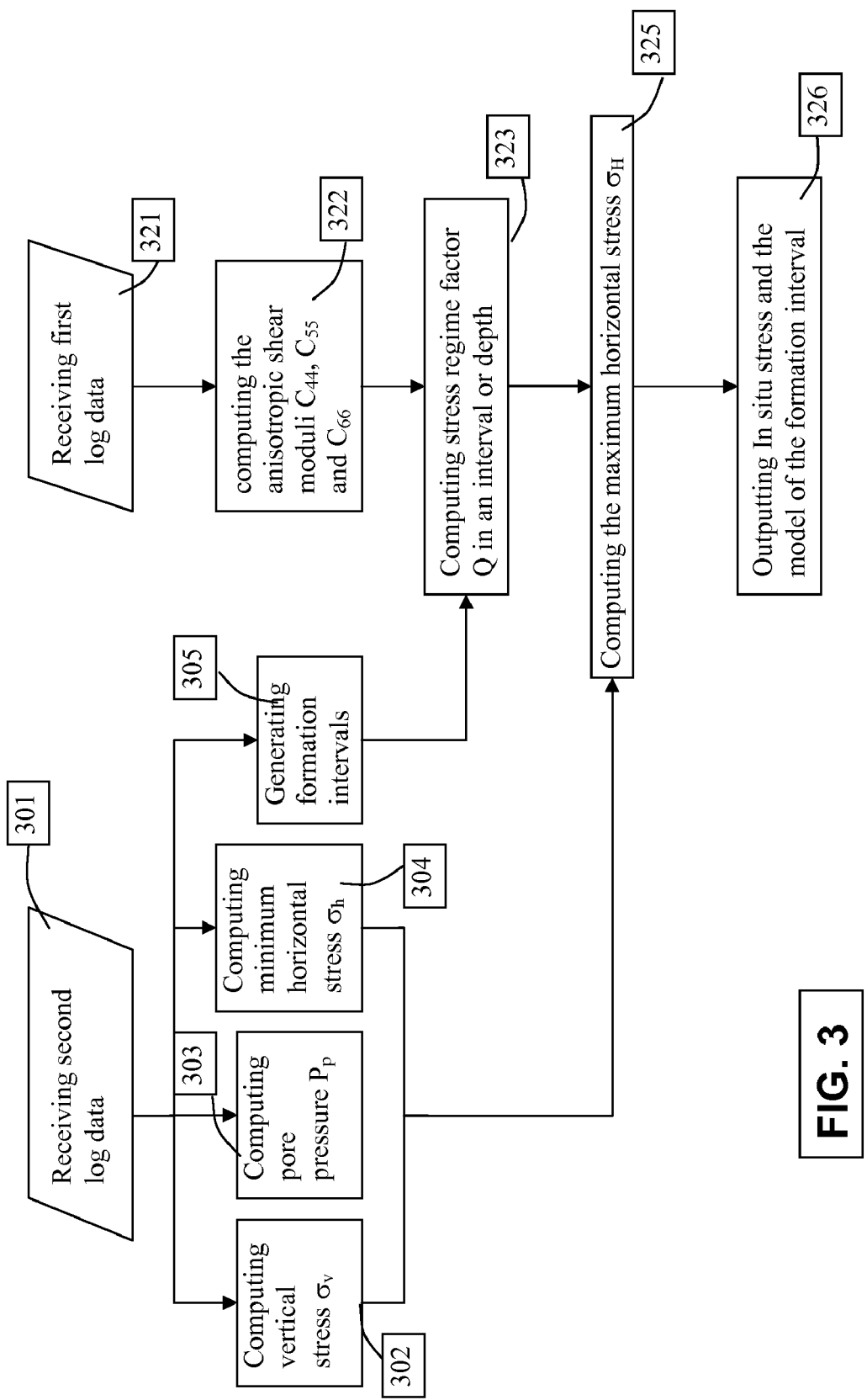
FIG. 3 shows a process of estimating in-situ stress and updating in-situ stress models in accordance with one embodiment of the invention.

According to one embodiment of the present invention and as shown in FIG. 3, a workflow for estimating the in-situ stresses comprises receiving a second log data 301, the second log data includes and not limited to density log data, formation resistivity log, GR and porosity log data. Using the log data received at step 301, the following steps are performed: Computing vertical stress $\sigma_V$ by integrating the density log data 302, wherein the measurement of rock bulk density can be performed using standard nuclear logging tools from the surface to the depth of interest (and then integrated over depth); Computing pore pressure $P_p$ by using standard models or correlations 303, wherein the models or the correlations are suitable for the field and calibrating the results with available data or measurement, more details of the method for computing pore pressure is disclosed by the commonly owned U.S. Pat. No. 6,351,991, Determining stress parameters of formations from multi-mode velocity data, issued to Sinha, et al., the entire teaching is incorporated herein as reference; Computing minimum horizontal stress $\sigma_h$ by using some standard models, more detail of the process for computing horizontal stress is disclosed in Haimson, B. C., F. H. Cornet, ISRM Suggested Methods for rock stress estimation Part 3: hydraulic fracturing (HF) and/or hydraulic testing of pre-existing fractures (HTPF), International Journal of Rock Mechanics & Mining Sciences 40 (2003) 10111020, and calibrating the result with leak-off test data or other test data 304; and Generating formation intervals 305.

As shown in FIG. 3, the workflow for estimating the in-situ stress also comprises receiving the first log data 321. The first log data includes sonic log data, which could be obtained through Sonic Scanner available from Schlumberger. The received sonic log data are then interpreted for computing the anisotropic shear moduli $C_{44}$, $C_{55}$ and $C_{66}$ at step 322. Using the formation intervals derived at step 305 and the anisotropic shear moduli $C_{44}$, $C_{55}$ and $C_{66}$ corresponding to a formation interval, the stress regime factor Q in the formation interval can be computed at step 323. According to the order of the magnitude of the anisotropic shear moduli $C_{44}$, $C_{55}$ and $C_{66}$, the corresponding stress type is determined from Normal faults, Strike-slip faults and Thrust faults, and a correlation for calculating stress regime factor Q is selected from one of the three equations. Then, the stress regime factor Q will be used together with the vertical stress $\sigma_V$ derived at step 302 and the minimum horizontal stress $\sigma_h$ derived at step 304 to compute the maximum horizontal stress $\sigma_H$. Finally, at step 326, output the In situ stress including the vertical stress $\sigma_V$, the minimum horizontal stress $\sigma_h$, the maximum horizontal stress $\sigma_H$ pore pressure $P_p$ and the azimuth of minimum horizontal stress corresponding to the formation interval.

Figure 4:
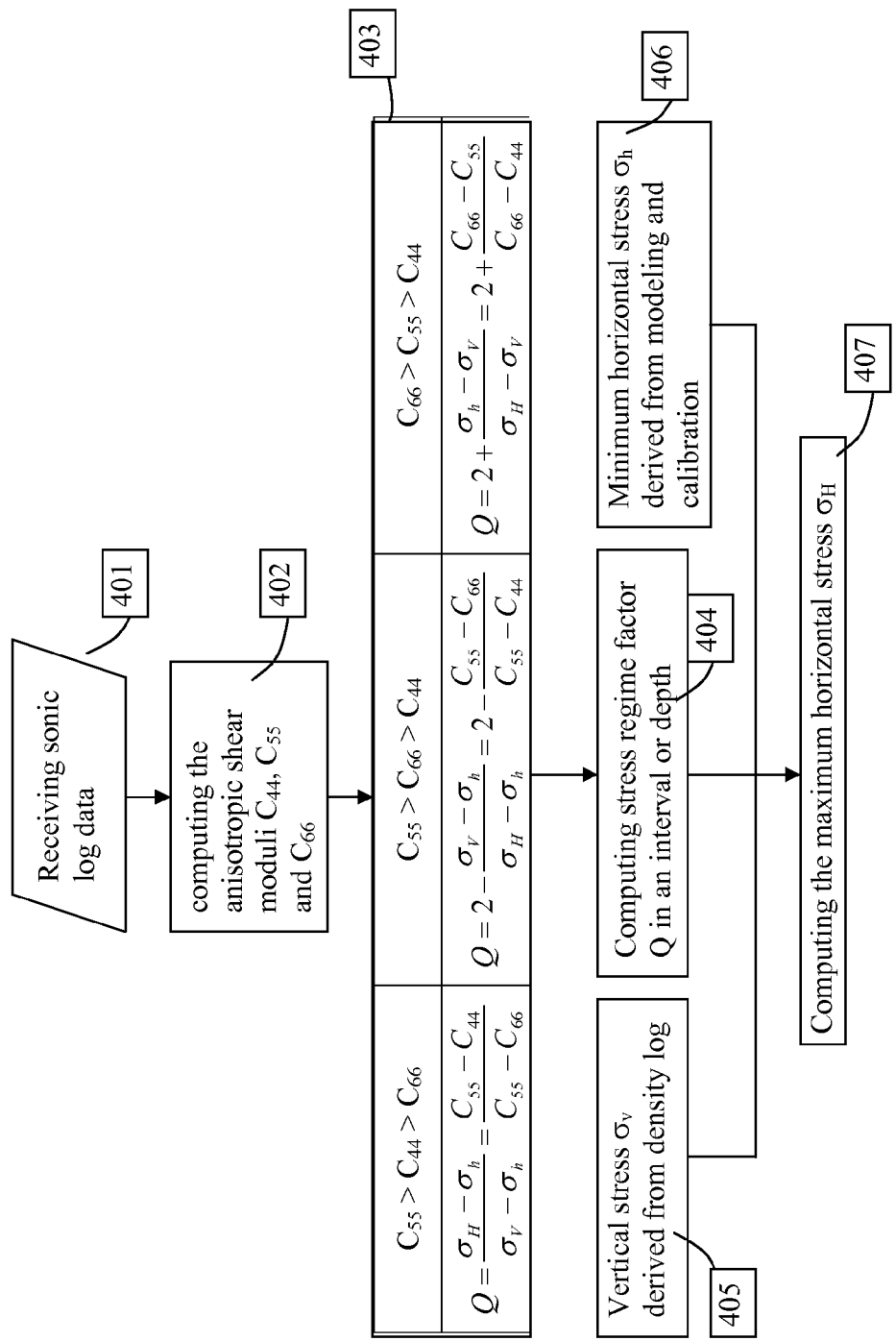
FIG. 4 shows a process of estimating maximum horizontal stress $\sigma_H$ in accordance with one embodiment of the invention.

According to one embodiment of the present invention and as shown in FIG. 4, a workflow for estimating maximum horizontal stress $\sigma_H$ of a desired formation interval starts with receiving sonic log data at step 401. Interpreting the received sonic log data and computing the anisotropic shear moduli $C_{44}$, $C_{55}$ and $C_{66}$ at step 402, which include receiving compressional, fast shear, slow shear and Stoneley velocities; receiving formation mass density and mud density data and determining the anisotropic shear moduli $C_{44}$, $C_{55}$ and $C_{66}$ by using the received data. More details of the method for computing the anisotropic shear moduli $C_{44}$, $C_{55}$ and $C_{66}$ are disclosed in U.S. Pat. No. 6,351,991 issued to Sinha et al., the entire teaching is incorporated herein as reference. The magnitude of the moduli $C_{44}$, $C_{55}$ and $C_{66}$ are then compared in step 403. According to the order of the magnitudes of the moduli $C_{44}$, $C_{55}$ and $C_{66}$, stress regime factor Q can be computed by using one of the equations (19), (20) and (21). Receiving the vertical stress $\sigma_V$ 405 derived from density log and receiving the minimum horizontal stress $\sigma_h$ 406 derived from modeling and calibration. By using the $\sigma_V$ and $\sigma_h$ together with Q, the maximum horizontal stress $\sigma_H$ can be computed with the corresponding equation selected from equations (19), (20) and (21).

Figure 5:
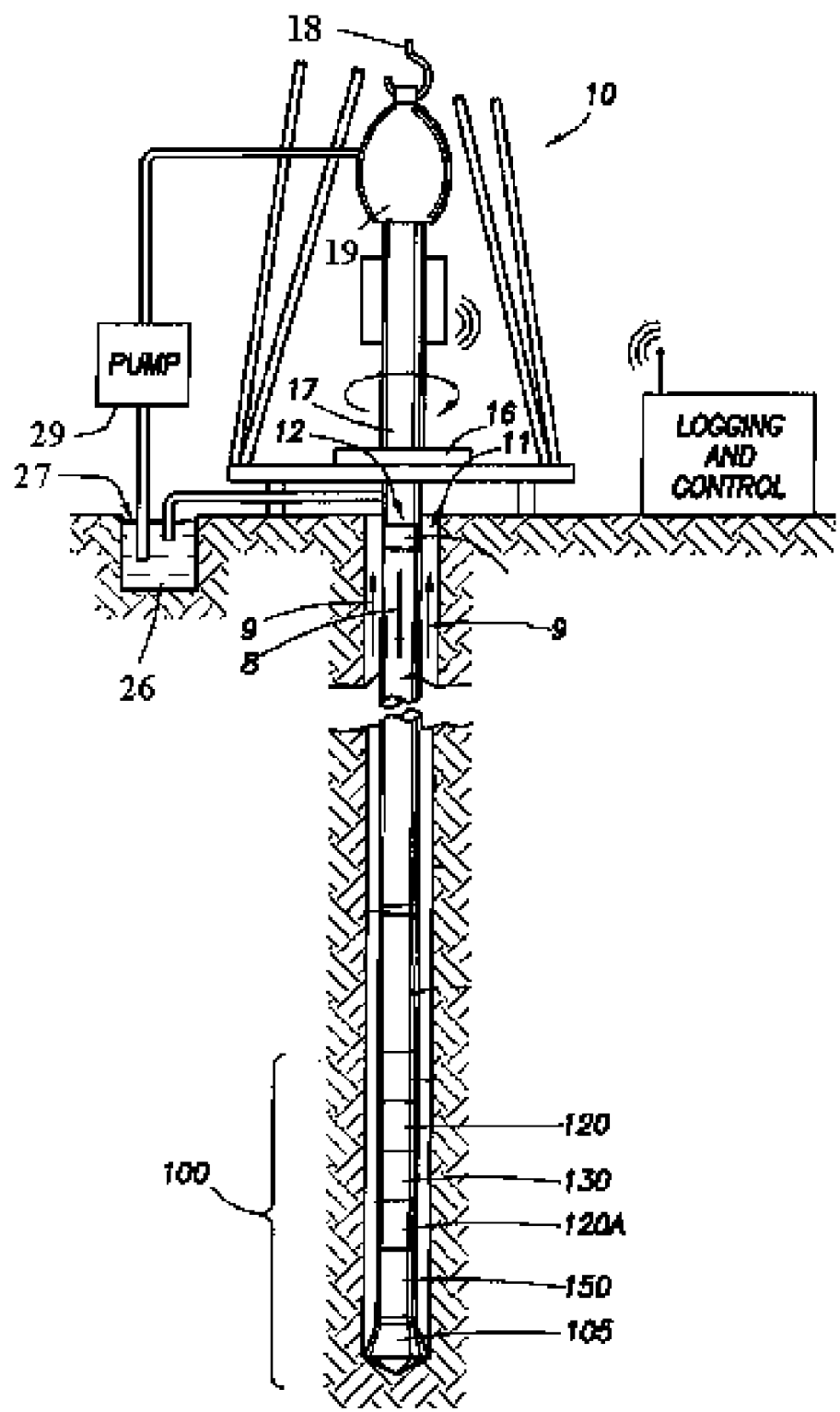
FIG. 5 shows a display of a wellsite system in which the present invention can be employed with at least one embodiment of the invention.

According to one embodiment of the present invention, a wellsite system in which the present invention can be employed is shown in FIG. 5. The wellsite can be onshore or offshore. In this exemplary system, a borehole 11 is formed in subsurface formations by rotary drilling in a manner that is well known. Embodiments of the invention are not restricted to be used in vertical wells, and embodiments of the invention can also use directional drilling, as will be described hereinafter.

Still referring to FIG. 5, a drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

Also referring to FIG. 5, according to the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-whiledrilling (LWD) module 120, a measuring-while-drilling (MWD) module 130, a rotor-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 6:
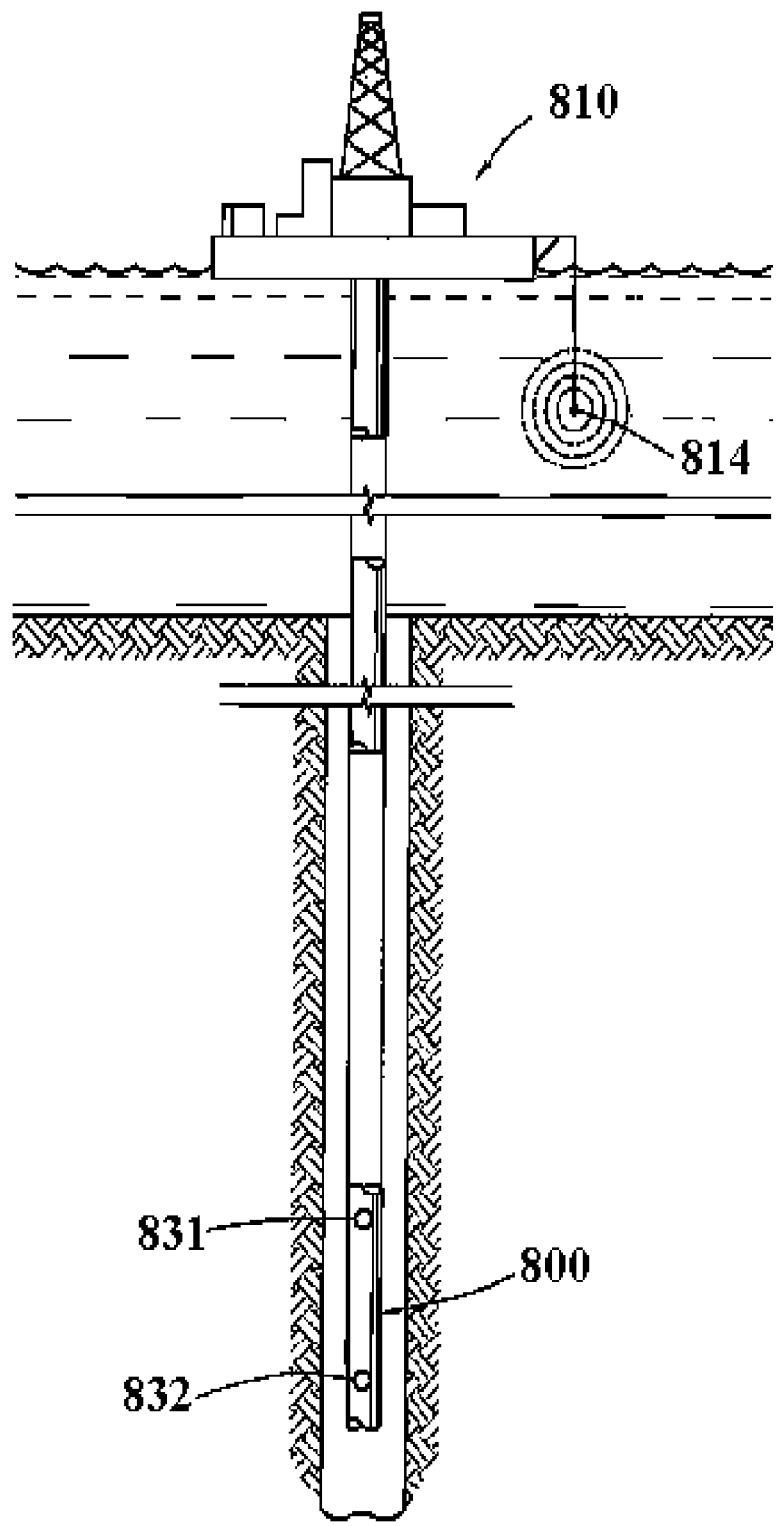
FIG. 6 shows a display of a sonic logging-while-drilling device that can be used with at least one embodiment of the invention.

FIG. 6 illustrates a sonic logging-while-drilling tool which is also shown in FIG. 5 as LWD tool 120, or can be a part of an LWD tool suite 120A. More details about the LWD tool is disclosed by U.S. Pat. No. 6,308,137, the entire teaching of which is incorporated herein by reference. According to one embodiment of the present invention, as shown in FIG. 6, an offshore rig 810 is employed, and a sonic transmitting source or array 814 is deployed near the surface of the water. Alternatively, any other suitable type of uphole or downhole source or transmitter can be provided. An uphole processor controls the firing of the transmitter 814. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 800 includes at least acoustic receivers 831 and 832, which are coupled to a signal processor so that recordings may be made of signals detected by the receivers in synchronization with the firing of the signal source.

Figure 7:
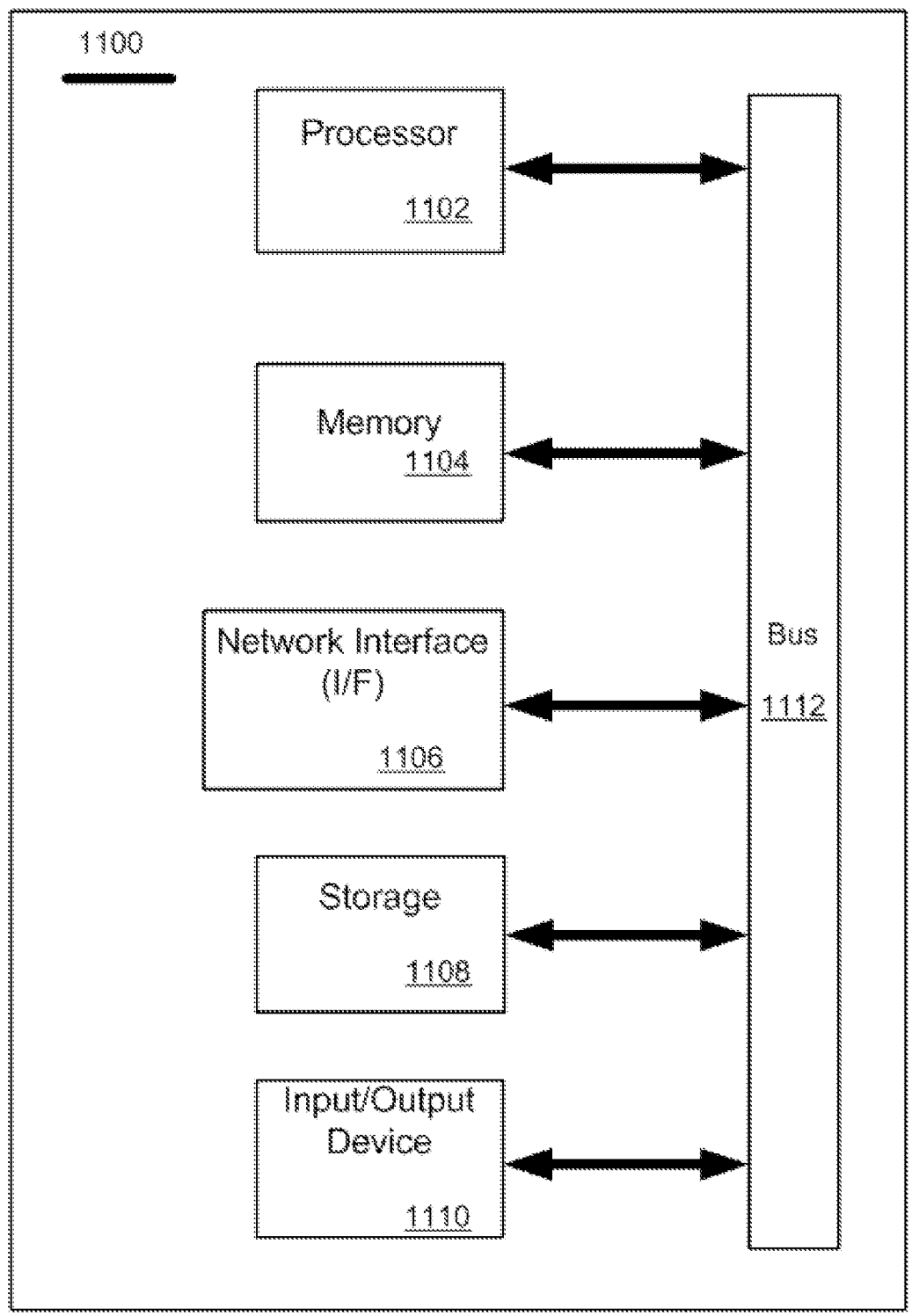
FIG. 7 shows a schematic illustration of a computer system for use in conjunction with at least one embodiment of the present invention.

According to one embodiment of the invention, a system for estimating in-situ stress is shown in FIG. 7. The system includes Memory 1104 (also referred to as a computer-readable medium) is coupled to bus 1112 for storing data and instructions to execute the workflow as shown in FIGS. 3 and 4, by processor 1102. Memory 1104 also may be used for storing temporary variables or other intermediate information during execution of instructions to be executed by processor 1102. Memory 1104 may also comprise a read only memory (ROM) or other static storage device coupled to bus 1112 for storing static information and instructions for processor 1102.

Network I/F 1106 comprises a mechanism for connecting to another device. In at least some embodiments, system 1100 comprises more than a single network interface.

A storage device (storage 1108), such as a magnetic disk or optical disk, may also be provided and coupled to the bus 1112 for storing data and/or instructions to execute the workflow as shown in FIGS. 3 and 4.

I/O device may comprise an input device, an output device and/or a combined input/output device for enabling user interaction with system 1100. An input device may comprise, for example, a keyboard, keypad, mouse, trackball, trackpad, cursor direction keys and/or an A/D card for receiving log data, sonic log data and Geological field data as illustrated in FIG. 3 and communicating information and commands to processor 1102. An output device may comprise, for example, a display, a printer, a voice synthesizer and/or a D/A card for outputting in-situ stress or in-situ stress regime, and communicating information to a user.

The functions of a method or the workflow described in connection with the embodiments disclosed herein may be embodied in hardware, executable instructions embodied in a computer-readable medium, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method for analyzing in-situ stress of a formation interval, comprising:

receiving a first log data and a second log data using an A/D card of a computer;

computing the anisotropic shear moduli $C_{44}$, $C_{55}$ and $C_{66}$ by using the first log data using the computer;

determining in-situ stress type based on the anisotropic shear moduli $C_{44}$, $C_{55}$, and $C_{66}$ and selecting an in-situ stress expression corresponding to the in-situ stress type using the computer;

computing Vertical stress $\sigma_v$ and Minimum horizontal stress $\sigma_h$ by using the second log data using the computer;

computing stress regime factor Q of the formation interval based on the in-situ stress type using the computer; and computing and outputting the maximum stress $\sigma_H$ by using the stress regime factor Q, Vertical stress $\sigma_v$, and Minimum horizontal stress $\sigma_h$ using the computer.

2. The method of claim 1, wherein determining in-situ stress type and selecting an in-situ stress expression comprises:

$$\text{if } C_{55} > C_{44} > C_{66}, Q = \frac{\sigma_H - \sigma_h}{\sigma_V - \sigma_h} = \frac{C_{55} - C_{44}}{C_{55} - C_{66}};$$

$$\text{if } C_{55} > C_{66} > C_{44}, Q = 2 - \frac{\sigma_V - \sigma_h}{\sigma_H - \sigma_h} = 2 - \frac{C_{55} - C_{66}}{C_{55} - C_{44}}; \text{ and}$$

$$\text{if } C_{66} > C_{55} > C_{44}, Q = 2 + \frac{\sigma_h - \sigma_V}{\sigma_H - \sigma_V} = 2 + \frac{C_{66} - C_{55}}{C_{66} - C_{44}}.$$

3. The method of claim 1, wherein the first log data includes sonic log data, and the second log data include density log data, formation resistivity log data, GR and porosity log data and borehole image log data.

4. The method of claim 3, wherein the Vertical stress $\sigma_v$ is computed by integrating the density log data from surface to the depth of the desired formation interval.

5. The method of claim 3, wherein the Minimum horizontal stress $\sigma_h$ is computed by standard models and calibrated with leak-off test data.

6. The method of claim 3 further comprising generating formation intervals by using the second log data.

7. The method of claim 6, wherein computing stress regime factor Q includes selecting a desired formation interval and computing stress regime factor Q of the formation interval.

8. The method of claim 1 further comprising receiving Geological field data and caliper data using the computer.

9. The method of claim 8 further comprising computing stress regime and azimuth of the minimum horizontal stress with the Geological field data and caliper data by in-situ stress models.

10. The method of claim 9 further comprising comparing the stress regime factor Q derived from the sonic log data with the stress regime derived from the Geological field data.

11. A system for analyzing in-situ stress of a formation interval, comprising a processor and a memory, wherein the memory stores a program having instructions executable by the processor for:

receiving first log data and a second log data;

computing the anisotropic shear moduli $C_{44}$, $C_{55}$, and $C_{66}$ by using the first log data;

determining in-situ stress type based on the anisotropic shear moduli $C_{44}$, $C_{55}$, and $C_{66}$ and selecting an in-situ stress expression corresponding to the in-situ stress type;

computing Vertical stress $\sigma_v$ and Minimum horizontal stress $\sigma_h$ by using the second log data;

computing stress regime factor Q of the formation interval based on the in-situ stress type; and computing and outputting the maximum stress $\sigma_H$ by using the stress regime factor Q, Vertical stress $\sigma_v$, and Minimum horizontal stress $\sigma_h$.

12. A non-transitory computer-readable medium storing a program having instructions executable by the processor for:

receiving a first log data and a second log data;

computing the anisotropic shear moduli $C_{44}$, $C_{55}$, and $C_{66}$ by using the first log data;

determining in-situ stress type based on the anisotropic shear moduli $C_{44}$, $C_{55}$, and $C_{66}$ and selecting an in-situ stress expression corresponding to the in-situ stress type;

computing Vertical stress $\sigma_v$ and Minimum horizontal stress $\sigma_h$ by using the second log data;

computing stress regime factor Q of the formation interval based on the in-situ stress type; and computing and outputting the maximum stress $\sigma_H$ by using the stress regime factor Q, Vertical stress $\sigma_v$, and Minimum horizontal stress $\sigma_h$.

* * * * *